Sept. 21, 1948. J. F. GEIGER 2,449,600
CARGO TIE-DOWN
Filed Aug. 1, 1944
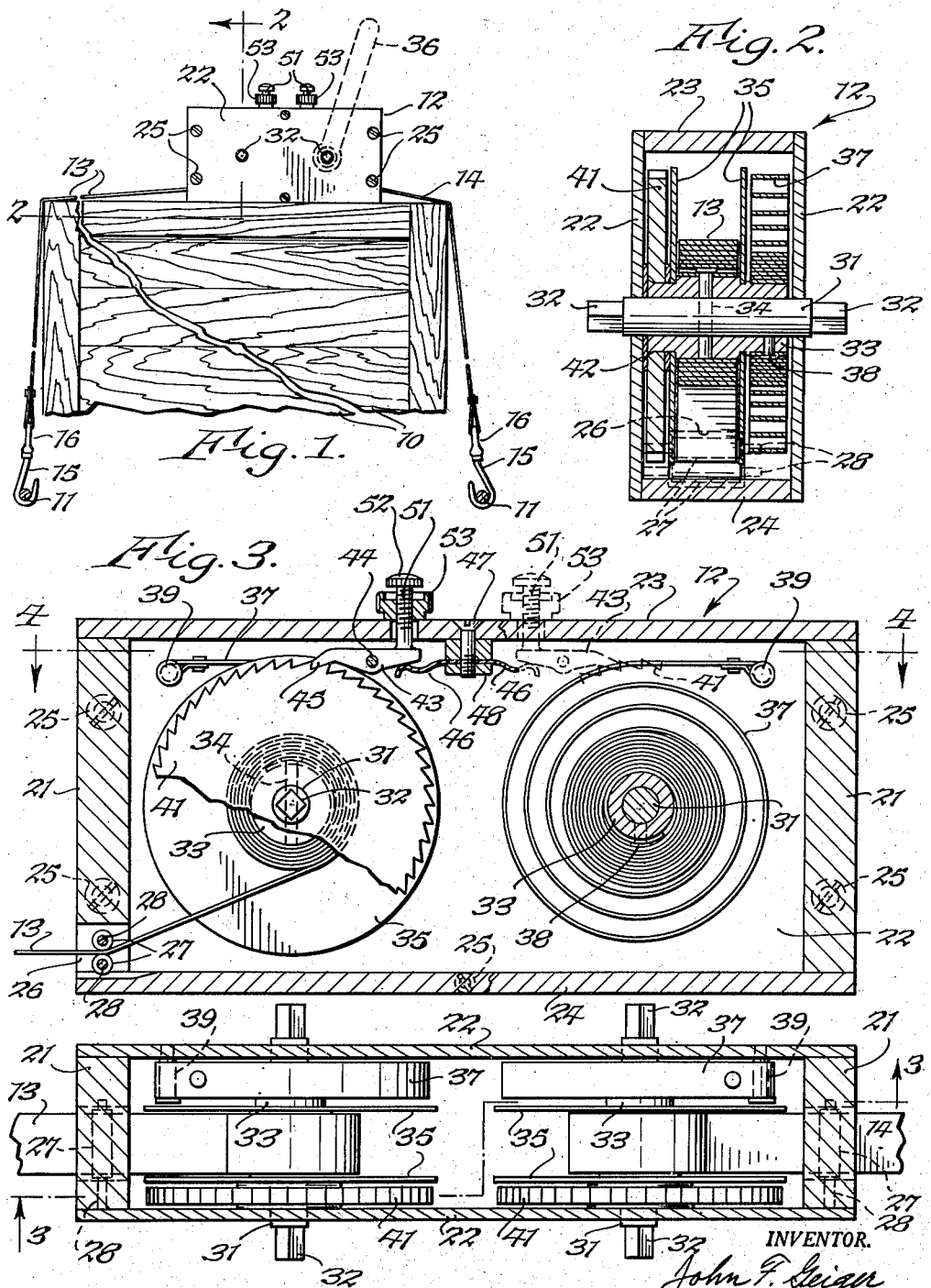
INVENTOR.
John F. Geiger,
BY Parker, Prochnow & Farmer,
Attorneys Patented Sept. 21, 1948

2,449,600

UNITED STATES PATENT OFFICE 2,449,600

CARGO TIE DOWN

John F. Geiger, Buffalo, N. Y.

Application August 1, 1944, Serial No. 547,613

5 Claims. (Cl. 248—361)

1

This invention relates to a tie-down device for articles of freight undergoing shipment, and it has particular reference to the provision of means for detachably securing the cargo to the supporting platform of the carrier.

It is essential, when transporting crates or other articles of appreciable weight or bulk, to secure such articles from displacement on the floor or platform on which they are placed, whether such platform be the deck of a ship, railway freight car, motor transport, or airplane. Heretofore it has been deemed necessary to secure such articles with supporting blocks or tie ropes positioned between the platform and the article, and the sufficiency of the stays has depended to a large extent upon the skill of the workmen and the absence of severe wrenching movements on the carrier while it is in motion. Particularly when freight is shipped by airplane or by sea, there is every likelihood that the cargo will be subjected to severe strains caused by the motion of the carrier in its natural medium. With airplane cargoes in particular, it is not possible to nail cleats or blocks here and there throughout the ship, as may be done with a railway freight car, because of the inherent nature of the airplane's construction. Accordingly, the securing of cargo in an airplane presents an unusually acute problem which cannot readily be solved by the conventional methods.

Another problem arising in shipment of freight by air is the necessity of stowing the cargo in the smallest possible space, and properly balancing the load so as not to interfere with the ship's stability. In this respect the problem is even more difficult than the stowage of cargo in a seagoing vessel. Airplane cargoes are also apt to be goods whose delivery is urgent, and therefore provision should be made to stow and secure the cargo and to get it out of the ship in the least possible time and in such manner that relatively unskilled labor can handle the shipment without damage to it or the airplane itself.

According to the present invention, the foregoing problems are solved by providing a tie-down device, or an apparatus by means of which securing ropes or cables can be firmly lashed around the articles of freight to hold them during shipment, and which also can be readily detached to release the articles, and which can be so positioned with respect to the articles and the carrier as to be readily accessible. As hereinafter described, the invention takes the form of a box-like unit having a pair of retractable cables connected thereto, and wherein means are provided to take up the slack on the cables so as to tie them down firmly against the article to be secured.

The invention also contemplates a tie-down device which is separate from the transport itself, so that the device may be used at one time on an airplane, and at another time on a ship, railway car, or motor truck, or other type of carrier.

Various other objects and features of the invention and the advantages to be derived from the practice thereof will become more apparent from a perusal of the following description of one embodiment illustrated in the accompanying drawings, wherein:

Fig. 1 is a fragmentary view illustrating the tie-down device as applied to a piece of freight undergoing shipment;

Fig. 2 is a transverse section taken along the line 2—2 of Fig. 1 and illustrating some of the details of the retracting mechanism for one of the securing cables;

Fig. 3 is a longitudinal section through the device taken substantially along the line 3—3 of Fig. 4, and showing details of the mechanisms applied to both cables; and Fig. 4 is a section taken substantially along the line 4—4 of Fig. 3.

In Fig. 1 there is shown a crate 10 illustrative of an article of freight undergoing shipment, which is understood to be resting on a platform of the carrier, the platform or adjacent portions of the carrier being provided with eyes 11 to provide an anchoring means. Positioned at any suitable point on the crate 10 is the tie-down device 12, from which extends two cables 13 and 14 each having a hook 15 at the outer end thereof, which is swivelly connected to its adjacent cable, as indicated by the numeral 16. The hooks 15 are adapted to engage the eyes 11 and thus secure the cables 13 and 14 at the free ends thereof. The other end of each cable passes into the device 12, wherein the arrangement is such that the cable can be drawn up tight or released as the occasion requires.

As best shown in Fig. 3, the tie-down device 12 comprises a substantially enclosed box having end walls 21, side walls 22 (see Figs. 2 and 4), and top and bottom walls 23 and 24. These walls may be of any suitable material such as steel plate, and they are secured to each other by suitable means such as screws 25, to provide a rigid casing having sufficient strength to withstand the stresses to which the unit will be subjected. Each end wall 21 is provided, adjacent the bottom wall 24, with an opening 26 extending part way along the end wall, and these openings provide mounting spaces for a pair of spaced guide rollers 27 rotatably mounted on axles 28 which are journalled in the end walls. The cables 13 and 14 pass between the guide rollers 27 in their movements with respect to the box. As herein illustrated, each cable 13 or 14 is a flat, flexible length of metal, such as steel, although it will be understood that fabric straps or ropes may be employed, if desired.

The inner ends of the cables are secured to reels providing means upon which the unextended portion of the cable may be wound. For this purpose, a pair of axles 31 having projecting and squared ends 32 are rotatably mounted between the side plates 22. Between the plates the axles are provided with sleeves 33 having enlarged center portions to which the inner ends of the cables 13 and 14 are respectively secured by means of through pins 34. The enlarged sleeve portion, which constitutes a reel for the cable, is faced on either side by means of a guide disc 35, this disc being pressed on or otherwise secured to the sleeve 33 in any desirable and satisfactory manner. The squared ends 32, which extend beyond the box, are adapted to receive a detachable handle 36 (Fig. 1) so that the reel may be manually operated, and from either side of the box.

Each of the reels is also provided with a retracting spring, as shown in Figs. 2, 3, and 4. The springs 37 are coiled or spiral springs having one end secured to the sleeve 33 by means of a pin 38, and the other end secured to one of the side walls 22 by means of a stud 39. These springs are so positioned with respect to the box and the reel that they normally tend to wind up the strap 13 or 14 on its companion axle 31. Thus, as described to this point, one may withdraw the cable 13 or 14 simply by pulling on its free end with sufficient force to overcome the tension of the spring 37, but upon releasing the withdrawing force, the spring will tend to pull the cable back into the box, wrapping it up on its reel. For practical purposes, the springs 37 should have enough tension to take up any natural or ordinary slack in the cable, and yet be sufficiently light as to permit a workman to withdraw the cable without undue effort.

In order to prevent the cables from snapping back immediately when the force on their free ends is released, each reel structure is also provided with a ratchet wheel 41 securely mounted on the sleeve adjacent the wall 22 remote from the spring 37 and spaced from the wall 22 by a thrust washer 42. The teeth of each ratchet wheel 41 are adapted to be engaged by a pawl 43 pivotally mounted on the side wall 22 by a stud 44 and having a detent 45 normally urged into engagement with the ratchet teeth by a spring 46. For the present purposes, the spring 46 is in the form of a leaf whose center portion is secured to the top wall 23 by means of a screw 47 and a nut 48. As there are two reels in the box, symmetrically disposed with respect to the transverse center, this type of construction simplifies the problem of urging each detent 45 into engagement with its related wheel 41. It will be seen that the arrangement is such that the springs 37 will urge the cables into retracted position, the detents 45 then riding freely over the ratchet teeth. When the detents are engaged, however, the cables cannot be pulled freely from the box.

Each pawl 43 is provided on its inner end with a threaded stud 51 projecting above the upper plate 23 and terminating in a finger piece or cap 52. The threaded portion of the stud 51 is also provided with a lock nut 53, so that when the nut is spun down on the top 23 and in the position shown in Fig. 3, the stud cannot be depressed by pushing on the cap 52. In such position, the pawl 43 is locked against the ratchet wheel, and the cable 13 or 14 cannot be withdrawn. However, the nut 53 may be readily backed off, and then the stud 51 can be depressed by pushing upon it to overcome the tension of the spring 46. When this is done, the detent 45 is released, and the cable can be moved in either direction, as heretofore explained.

In use, it will be assumed that the problem is to secure the cargo package 10 to the carrier so that the cargo cannot be displaced during shipment. This cargo, of course, has already been positioned adjacent the eyes or other connecting means 11, which are secured to the carrier itself. The operator thereupon throws one hook 15 over one of the eyes 11, and if he cannot get the unit 12 close enough with the adjacent cable in its fully retracted position, he can extend the cable to any extent desired in a relatively simple fashion. Thus, the hook extending beyond the box can be grasped on one hand, and the box itself can be placed anywhere on the cargo or on the carrier that seems expedient. By depressing the stud 51 with the other hand, in the manner just described, enough cable can be pulled out to reach the eye 11. Upon releasing the finger pressure from the stud 51, the spring 46 causes the detent 45 to engage its adjacent ratchet wheel, and the spring 37 will then take up any great excess of slack in the cable itself. By providing two cables within the box 12, the operator can position the unit in any position he desires, paying out more or less of each cable 13 or 14, as the situation indicates.

After both hooks 15 have been secured, and the box 12 has been located in its most convenient or satisfactory place, the handle 36 is applied to any or all of the squared portions 32, and the spring tension tending to take up the cables is then augmented by manual tightening, so as to draw the cables up as snugly as the situation requires. When this is done, the nuts 53 are spun down to lock the detents 45 against accidental displacement.

It will be seen that the provision of two separate drums and two retractable cables enables the tie-down device to be located at any expedient point, and it is accordingly not necessary to make laborious adjustments in the length of one cable in order to effect a satisfactory securing of the freight. By providing the axles 31 with squared ends on either side, it is possible to operate the unit from either side, and this is frequently a matter of considerable importance when securing cargo in the relatively limited confines of an airplane. It will also be noted that the tension applied to each of the two cables opposes the tension in the other cable, so that they work conjointly to resist the displacing forces encountered during shipment. By providing the locking means for the ratchet detents, the whole unit is secured within itself, and thus the likelihood of displacement of the cargo is minimized.

It is also to be noted that the tie-down device is a unitary structure and, except for the necessary provision of some means on the carrier for one end of the cables, the device is independent of the carrier itself. Thus, when freight is subject to trans-shipment, the freight and the tie-down device may both be removed from the first carrier and applied to the next carrier, whether the transfer is from airplane to airplane, or to ship or truck, or other type of conveyance. The construction is moreover such that it may be readily and quickly applied or detached by persons having little experience in securing items of cargo.

While the invention has been described with respect to one specific embodiment, into which have been incorporated preferred forms of construction, it will, of course, be understood that the invention is susceptible of numerous modifications without departure from its purposes or spirit. For example, under certain conditions it may be found unnecessary to have two adjustable cables, and it is also apparent that other forms of shaft locking devices may be utilized in lieu of the ratchet and detent mechanism specifically illustrated. It is accordingly intended that all such modifications and variations shall be considered to be within the scope of the invention as set forth in the following claims. The word "cables" is herein employed to designate any flexible tension member or strap, regardless of whether the same is made of metal, fibrous material, or leather.

I claim:

1. A portable and self-contained tie-down device for securing cargo, comprising a box-like structure having apertured end walls, cables having free ends extending through said end walls in opposite directions, and means within the structure for securing each of said cables at various extended lengths, said last named means including locking members mounted on said structure and manually operable to secure said cables against movement with respect to the box and to release each of said cables separately, whereby said device may be applied to various types of cargo and carriers and be located in a plurality of positions between the free ends of said cables and with respect to said cargo and carrier.

2. A tie-down device comprising a box having end and side walls, a pair of shafts mounted in spaced relation between the side walls, reels mounted on the shafts, springs connected to the reels and biasing them toward rotation in a wind-up direction, means interposed between the reels and box for releasably locking the reels against unwinding rotation, a cable for each reel having one end wrapped around a reel and a free end, an aperture formed in each end wall adjacent the reel, guide rollers mounted in each of said apertures, the free end of each cable extending between and beyond said guide rollers.

3. A tie-down device for securing cargo to a carrier and comprising a pair of reels each having a cable secured at one end thereto, said cables extending in opposite directions from said device about the cargo and having their free ends formed for attachment to said carrier at opposite sides of the cargo and to move away from said reels as the reels are unwound, means for supporting said reels with their axes in fixed relation to each other, and means acting on said reels for applying tension to said cables to secure the cargo to said carrier.

4. A tie-down device for securing an article to a support and comprising a pair of reels, each having a cable secured at one end thereto, said cables having their other ends extending in opposite directions from said device and formed to be secured to the support at opposite sides of the article, a member on which both of said reels are pivotally mounted, releasable means for locking said reels against turning in a direction to unwind said cables therefrom, and means for applying tension to one of said reels for tensioning said cables to press the article toward said support.

5. A tie-down device for securing an article on a support and comprising a housing, a pair of reels each having a cable secured at one end thereto, said cables extending out of said housing in opposite directions and having their free ends formed for connection with said support, ratchet means associated with said reels, dogs for releasably holding said reels to prevent unwinding of said cables, and means for turning one of said reels in a direction to wind its cable thereon, for applying tension to both of said cables to secure the article to the support.

JOHN F. GEIGER.

REFERENCES CITED

The following references are of record in the file of this patent:

UNITED STATES PATENTS

| Number | Name | Date |
|---|---|---|
| 305,583 | Fontaine | Sept. 23, 1884 |
| 422,381 | Cole | Mar. 4, 1890 |
| 422,591 | Hayden et al. | Mar. 4, 1890 |
| 447,889 | Matteson | Mar. 10, 1891 |
| 903,169 | Brennan | Nov. 10, 1908 |
| 962,099 | Reinhart et al. | June 21, 1910 |
| 1,284,039 | Atwood | Nov. 5, 1918 |
| 1,566,740 | Forrest | Dec. 22, 1925 |
| 1,569,699 | Bergstrom et al. | Jan. 12, 1926 |